Sept. 3, 1968

G. HUMMEL 3,399,794

TRUCK BODY

Filed March 30, 1967

INVENTOR.
GAIL HUMMEL

BY
McLaughlin, Cahill & Drummond

ATTORNEYS

Sept. 3, 1968  G. HUMMEL  3,399,794
TRUCK BODY

Filed March 30, 1967  8 Sheets-Sheet 2

INVENTOR.
GAIL HUMMEL
BY
McLaughlin, Cahill & Drummond
ATTORNEYS

INVENTOR.
GAIL HUMMEL
BY
McLaughlin, Cahill & Drummond
ATTORNEYS

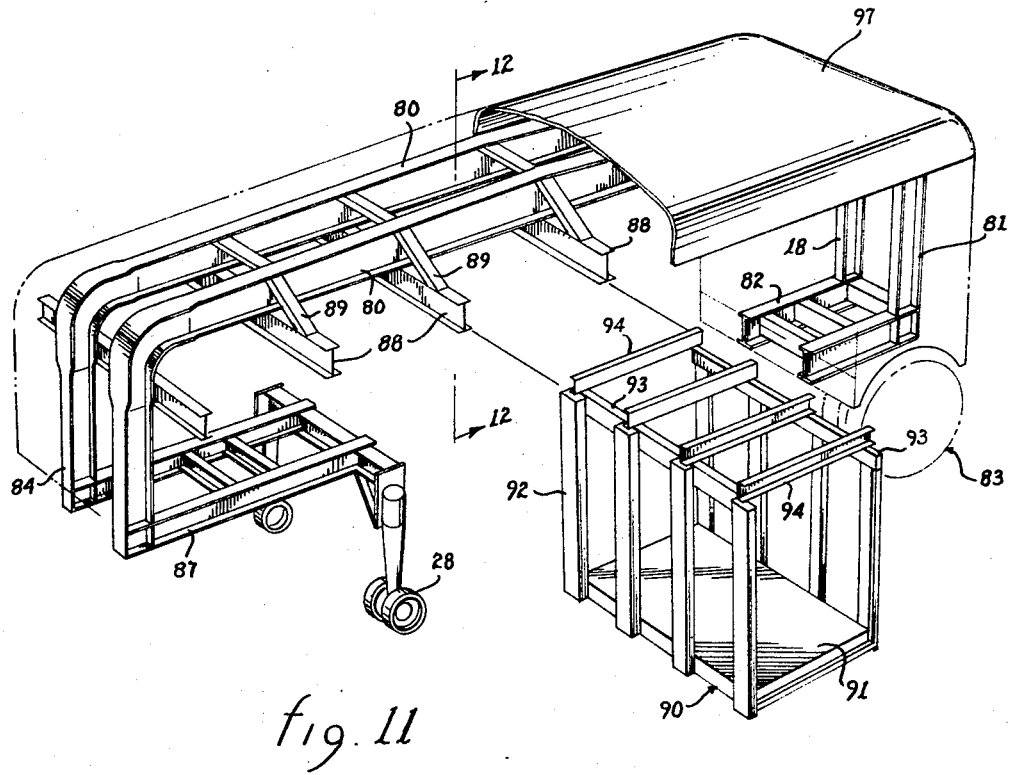

Sept. 3, 1968 G. HUMMEL 3,399,794
TRUCK BODY
Filed March 30, 1967 8 Sheets-Sheet 6

INVENTOR.
GAIL HUMMEL
BY
Drummond & Cahill
ATTORNEYS

Sept. 3, 1968     G. HUMMEL     3,399,794
TRUCK BODY
Filed March 30, 1967     8 Sheets-Sheet 7
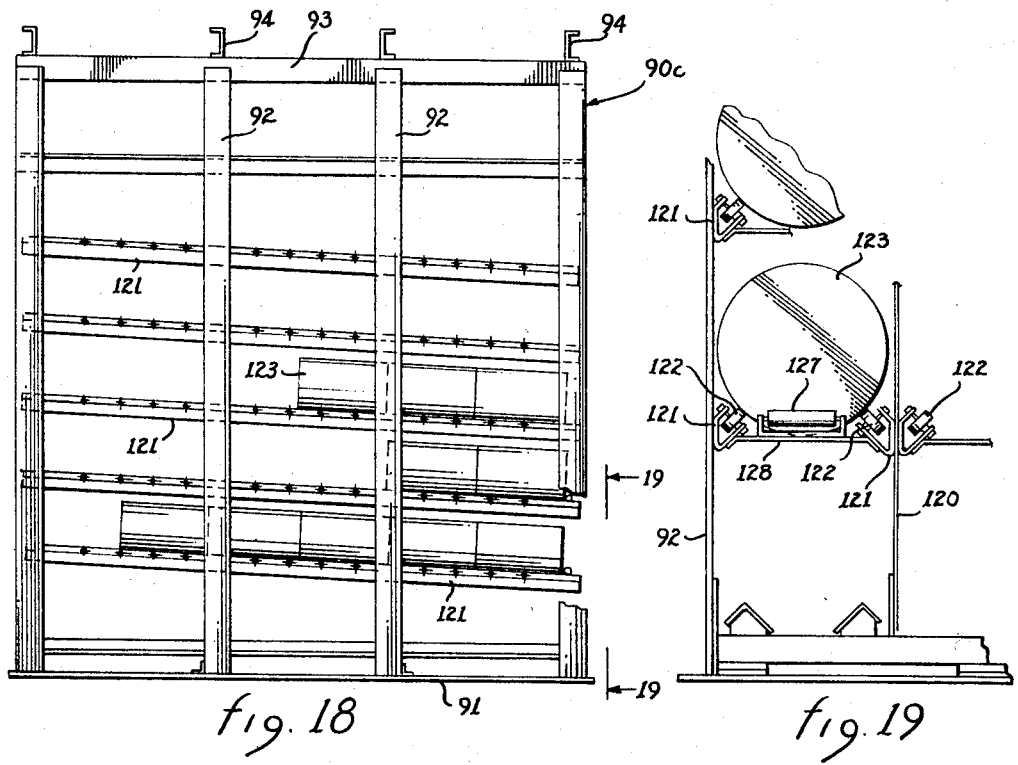
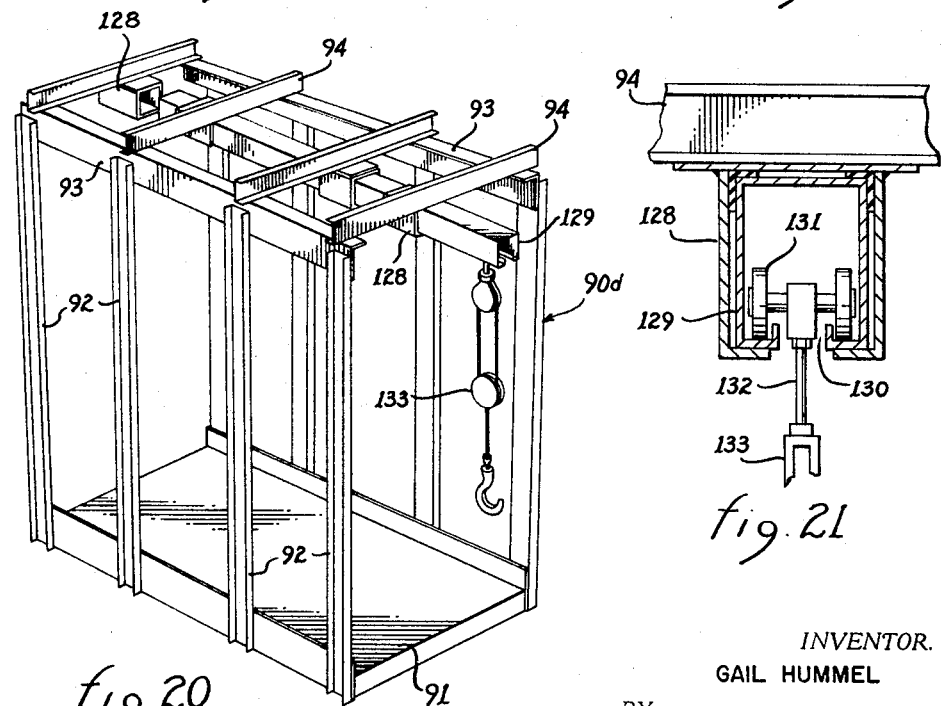
INVENTOR.
GAIL HUMMEL
BY
Drummond & Cahill
ATTORNEYS Sept. 3, 1968 G. HUMMEL 3,399,794
TRUCK BODY
Filed March 30, 1967 8 Sheets-Sheet 8

INVENTOR.
GAIL HUMMEL
BY
Drummond & Cahill
ATTORNEYS

United States Patent Office 3,399,794
Patented Sept. 3, 1968

3,399,794
TRUCK BODY
Gail Hummel, 3939 N. Romero Road,
Tucson, Ariz. 85705
Continuation-in-part of application Ser. No. 510,106,
Nov. 26, 1965. This application Mar. 30, 1967,
Ser. No. 644,040
3 Claims. (Cl. 214—394)

ABSTRACT OF THE DISCLOSURE

A truck body having an overhead frame detachably supporting interchangeable modular load carrying units. The modular load carrying units are uniform in external dimensions and are constructed and equipped to accommodate various transportation requirements.

This application is a continuation in part of my previously filed copending application, "Truck Body," Ser. No. 510,106, filed Nov. 26, 1965.

The present invention pertains to a truck body.

More specifically the invention relates to a truck body of the type generally used for transporting packaged materials and unitary objects such as cases of soft drinks, refreshment vending machines and the like.

In a further aspect the invention relates to a truck body of the above type utilizing interchangeable load-carrying sections specially adapted to accommodate the specific cargo to be transported.

Trucks currently utilized by the transportation industry are usually especially constructed for the transportation of a specific type of cargo. A truck body intended for the transportation of bakery goods, for example, would be highly inadequate for the transportation of cases of soft drings or household furniture. Adequate cargo handling facilities have not been accomplished even within certain specialized areas of transportation.

The lack of adequate transportation facilities is particularly acute in the soft drink industry. Trucks presently utilized to transport cases of bottles require an inordinate amount of operative time to load and unload the trucks both at the bottling plant and at the place of delivery. Many attempts have been made by the prior art to provide conveyors on trucks to facilitate removal of the cases. However, the prior art designs have been unable to achieve an acceptable design where any sufficient number of cases may be carried without undue complications and inconvenience to the operator. Further, prior art truck body designs resulted in heavy cumbersome equipment incapable of being transported without exceedingly heavy and bulky structural member design.

In addition to the aforementioned inadequacies, the soft drink industry is required to maintain a large fleet of varied trucks. One specific type of truck must be provided to facilitate cased bottles while another truck is necessary to accommodate premixed tanks. Still another type of truck incorporating some type of life mechanism is necessary for the transportation of soft drink vending machines.

It would be highly advantageous, therefore, to provide a simplified truck body design readily adaptable for optimum accommodation of various transportation needs.

Accordingly, it is a principal object of the present invention to provide a truck body having interchangeable modular load-carrying sections.

Another object of the present invention is to provide a truck body having a section containing a plurality of transfer conveyors inclined to enable the contents on each conveyor to be readily removed by the operator at the delivery station while enabling the truck to carry greater quantities of packaged material.

Still another object of the present invention is to provide a truck body of the type utilized to carry cases of bottled beverages wherein the truck may readily be automatically loaded and unloaded.

A still further object of the present invention is to provide a truck body whereby the truck operator may conveniently and readily load and unload heavy cumbersome objects.

These and other, further, and more specific objects and advantages of the present invention will become apparent to those skilled in the art from the following detailed description of the invention taken in conjunction with the drawings in which:

FIG. 11 is a partial perspective view of a truck body of the tractor-trailer type and associated modular load-carrying section constructed in accordance with the teachings of the present invention.

FIG. 12 is a cross sectional view of FIG. 11 taken along line 12—12.

FIG. 13 is a side view illustrating a means for securing the load carrying section to the main truck body.

FIG. 18 is a side elevational view of a modular load carrying unit especially adopted for the transportation of cylindrical containers.

FIG. 19 is a partial elevational view looking in the direction of the arrows 19—19 of FIG. 18.

FIG. 20 is a perspective view of a modular load-carrying section utilizing an overhead hoist.

FIG. 21 is an elevational view in sections illustrating the operative features of the overhead hoist of FIG. 20.

Briefly, in accordance with one embodiment of the present invention, a truck body is provided with an overhead load bearing frame member extending upwardly at one end of the truck body and then extending longitudinally of the truck body. The overhead frame eliminates the bulky and inconvenient frame normally found in prior art truck body designs. Modular load-carrying sections are then suspended from the overhead frame and since the frame is no longer underneath the load or material to be transported, the sections may be mounted lower than would normally be permitted by prior art designs. The depending and supported load-carrying sections may be constructed in a variety of types, each designed to accommodate a specific transportation requirement. Since each load-carrying section has the same external dimensions and is readily and conveniently attached or detached to the overhead load-bearing frame member the load characteristics of the truck are highly flexible.

In one embodiment, the load-carrying sections support conveyors that are arranged so that each conveyor may be unloaded from one side of the truck and reloaded from the opposite side of the truck. In another arrangement, a section of the floor of the load-carrying section acts as an elevator to drop to the ground for ease in loading and unloading heavy bulky objects. The weight of a full load on a truck body normally causes flexures in the frame tending to obstruct proper operation of conveyors in elevators. However, the arrangement of the load-bearing frame or the load-carrying sections permits frame flexure without interfering with the operating mechanism of the load-carrying sections, and without causing flexure loads thereon. Overhead retractable doors supported by frame members extend down over the side of the truck to enclose the load-carrying sections.

Figure 1:
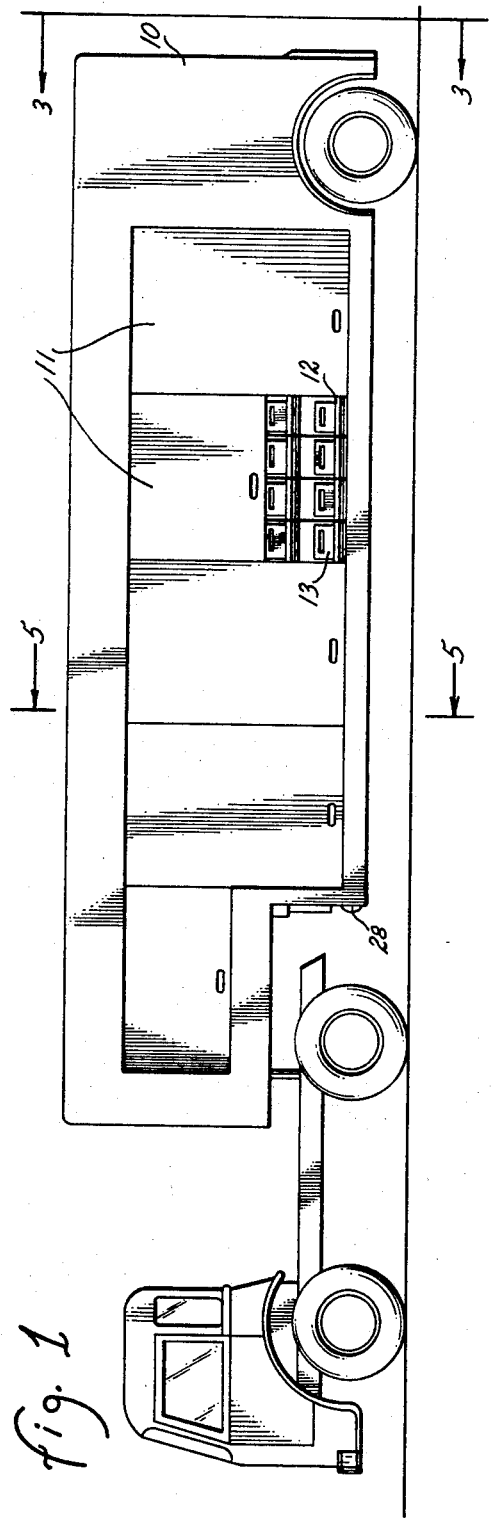
FIG. 1 is a side elevational view of a truck body of the tractor-trailer type constructed in accordance with the teachings of the present invention.
Figure 2:
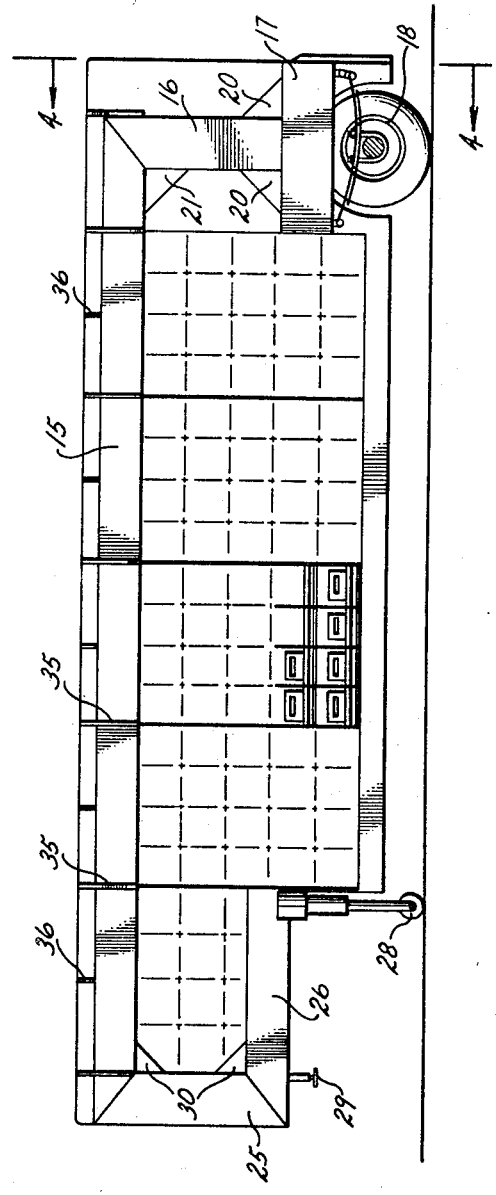
FIG. 2 is a side elevation, partly exposed, of the truck body trailer of FIG. 1.

Turning now to the drawings, in which the same reference numerals indicate corresponding elements throughout the several views, reference is first made to FIGS. 1 and 2 which illustrate a truck body of the trailer type constructed in accordance with the teachings of the present invention and incorporating load-carrying sections particularly constructed as conveyor type carriers for packaged materials or cased bottled soft drinks. FIG. 1 is shown as having the usual sheet metal covering 10 extending over a large portion of the truck body or trailer. Overhead sliding doors 11 are journalled in tracks so that they may be raised and lowered to cover the sides of the truck body or may be raised to expose the end of the conveyors such as shown at 12. The packaged materials or the cased bottled soft drinks shown at 15 are held in position on each of the conveyors through the utilization of a conveyor gate to be described more fully hereinafter. The conveyors 12 are mounted in the truck body through the expediency of an overhead load-bearing frame member 15 which, in the embodiment chosen for illustration, is formed from a pair of steel beams. The frame extends upwardly at 16 from a truck bed 17 supported above the ground through the expediency of a conventional spring, axle, and wheel arrangement 18. The upwardly extending portion 16 is secured to the bed in any convenient manner and may be provided with gusset plates 20 to strengthen the joint. The upstanding portion 16 is joined to the overhead longitudinally extending portion 15 and the joint there between may be strengthened by a gusset 21. The overhead load-bearing frame member 15 is supported at the forward end of the truck body by an upwardly extending mating beam 25 which, in turn, is joined to the frame portion 26 utilized to support the necessary hydraulically extending parking wheel 28 and hitch 29. The joints between the frame members 15 and 25 and between 25 and 26 may also be strengthened by gusset plates 30. Transverse plates 35 are welded or otherwise secured at predetermined intervals along the overhead load-bearing frame member 15. Each of the transverse plates provides a means for "hanging" or supporting the conveyor sections as will become apparent from the description to follow. Roof supports 36 are also spaced at predetermined intervals along the top of the load-bearing frame 15 and may be used to support the usual sheet metal covering.

Figure 3:
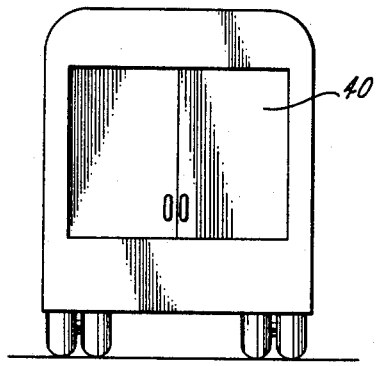
FIG. 3 is an end view of FIG. 1 taken along line 3—3.
Figure 4:
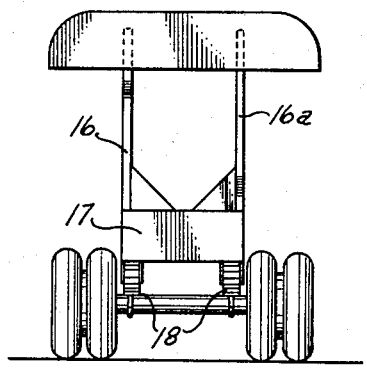
FIG. 4 is an end view of FIG. 2 with portions of the rear of the trailer removed, taken along line 4—4.
Figure 5:
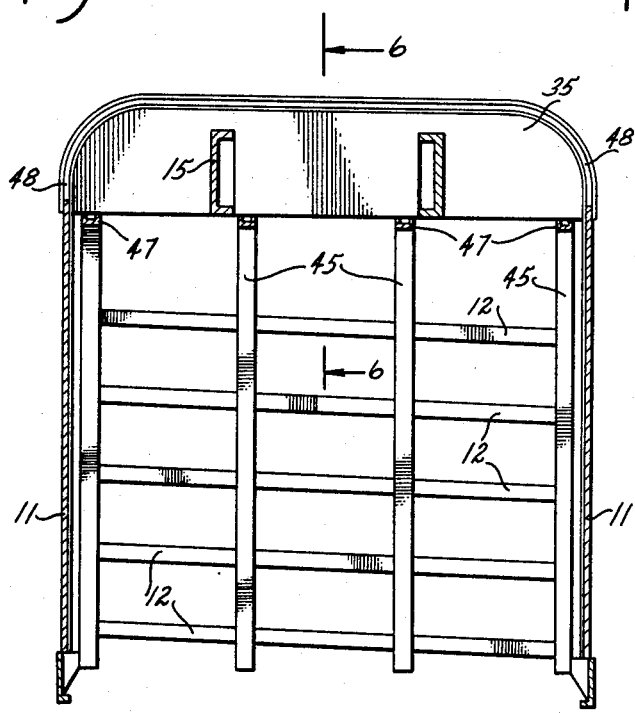
FIG. 5 is a cross-sectional view of FIG. 1 taken along line 5—5.

Referring to FIGURES 3, 4, and 5, various sections of FIGS. 1 and 2 are shown. In FIGURE 3, the rear view of the truck body is shown where it may be seen that a pair of doors 40 are used to gain access to the storage space provided in the area around the upwardly extending frame member. In FIGURE 4, the frame member 16 is shown extending upwardly from the bed 17 as discussed previously. The mating frame member 16a is shown extending upwardly parallel to the member 16. The spring, axle, and wheel assemblies 18 are also shown in FIGURE 4. Referring to FIGURE 5, a cross-sectional view of FIGURE 1 is shown taken along line 5—5. In FIGURE 5, it may be seen that the conveyors 12 are each inclined so that the cases supported by the conveyors are urged to the right side of the truck. Each of the conveyors 12 is supported by conveyor hangers 45. The overhead load-bearing frame member is shown supporting the transverse plate 35 to which is secured longitudinal stringers 47 which act as anchoring points for the conveyor hangers. In the embodiment chosen for illustration, the overhead collapsible doors 11 may be slid upwardly into tracks 48 provided therefore by the transverse plate 35. The track may more readily be seen by reference to FIGURE 6 which is a sectional view of FIGURE 5 taken along line 6—6.

Figure 6:
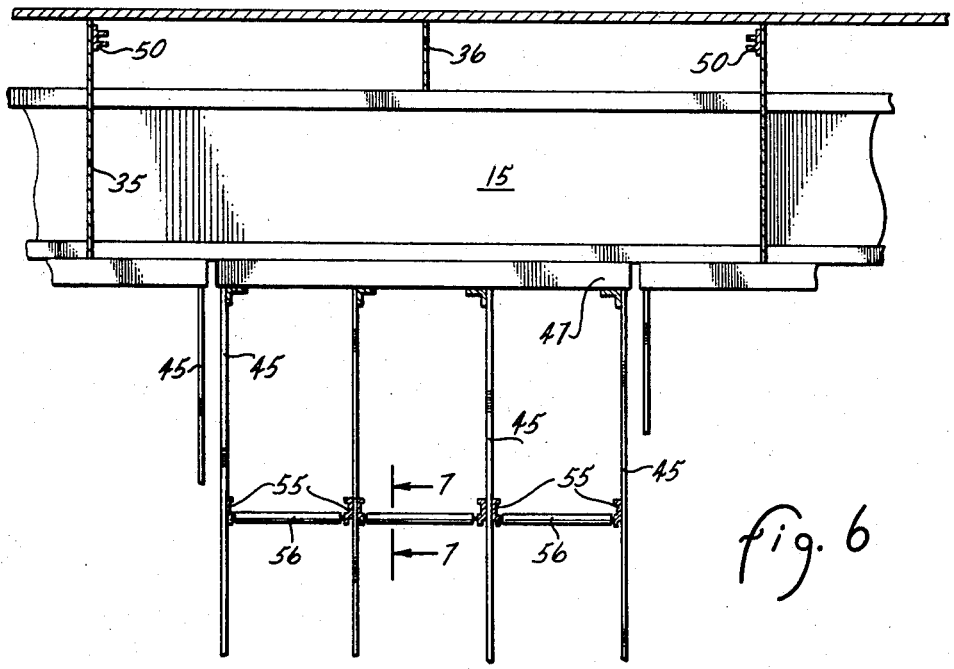
FIG. 6 is a cross-sectional view of a portion of FIG. 5 taken along line 6—6.
Figure 7:
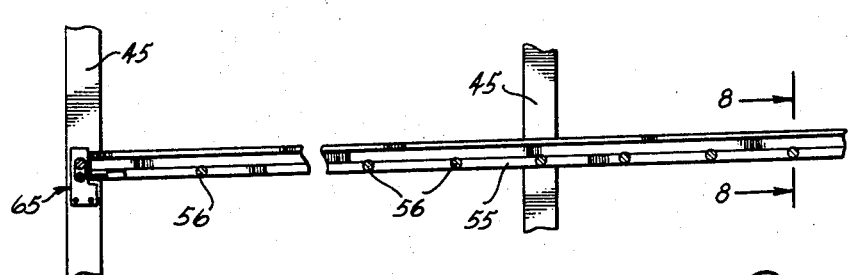
FIG. 7 is a view of a portion of FIG. 6 taken along line 7—7.
Figure 8:
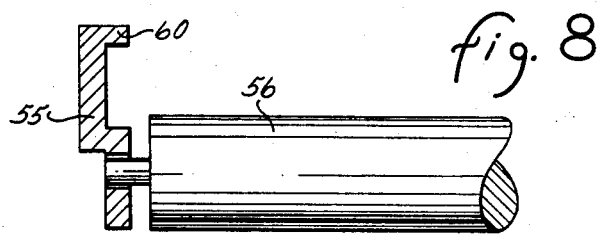
FIG. 8 is an enlarged view of a portion of FIG. 7 taken along line 8—8 and to an enlarged scale.

Referring to FIGURE 6, the transverse plates 35 are each provided with channel members 50 having a cross section to accommodate the folding door 11. The doors on either side of the truck body may then simply be raised and will subsequently follow the channels 50 to an overhead position to expose the ends of the conveyors. The roof supports 36 may also be seen in FIGURE 6 and the longitudinal stringers 47 are shown supporting the conveyor hangers 45. Each of the conveyor hangers includes a plurality of journalled blocks 55 arranged in pairs to support the rollers 56 of a roller conveyor. The conveyors are thus arranged in conveyor sections wherein each section comprises a plurality of vertically spaced roller conveyors extending transversely of the truck body. Each of these conveyor sections are supported by pairs of conveyor hangers depending from and secured to the overhead load bearing frame member 15 through the expediency of longitudinal stringers 47 and transverse plates 35. The details of one of the roller conveyors may be seen by referring to FIGURES 7 and 8. The roller conveyor comprises a plurality of rolls 57, each journalled in a journal block 55 which also forms a side rail of the conveyor. The cross sectional configuration of the rail 55 includes a tip 60 which protrudes toward the interior of the conveyor to facilitate guiding cases as they are transported along the conveyor. Each of the conveyors includes a gate 65 which may more readily be described by reference to FIGURES 9 and 10.

Figure 9:
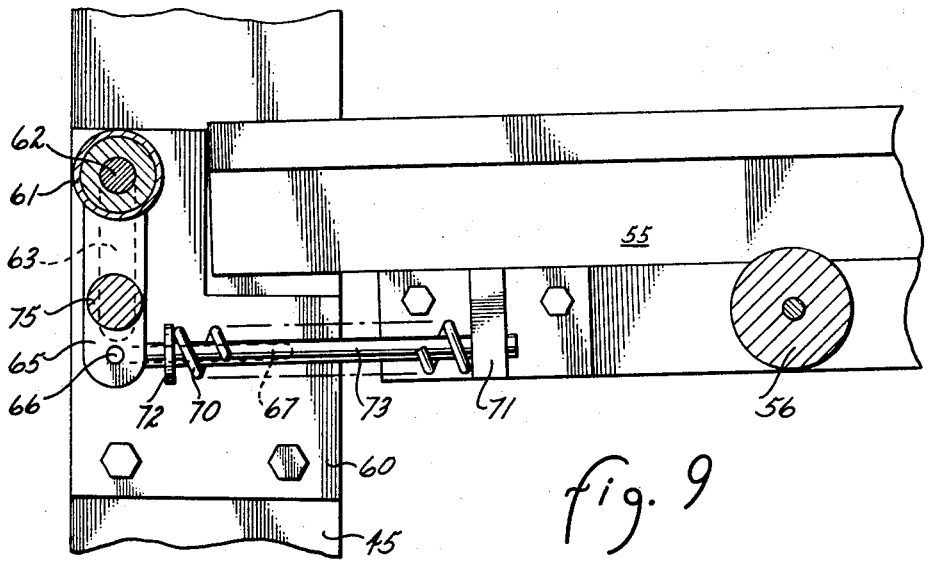
FIGS. 9 and 10 are enlarged views of end gates used at each end of the transverse conveyors.
Figure 10:
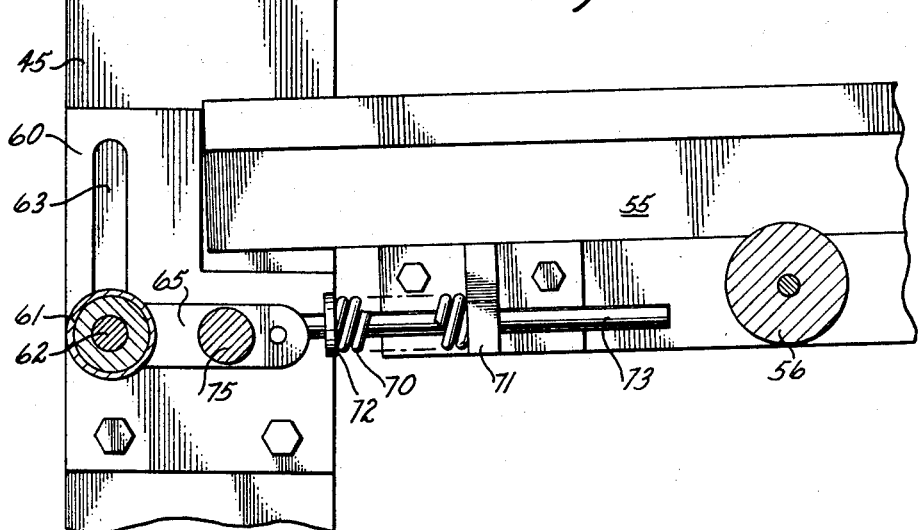

In FIGURES 9 and 10, the conveyor rollers 56 and the conveyor rails and journal blocks 55 are shown. The conveyor hangers 45 positioned at the lower side of the conveyors are provided with slotted members 60 which operate in pairs to support a gate roller 61. The roller 61 is journalled on a shaft 62 which is free to move vertically in the slot 63. The shaft 62 is also secured to a spring arm 65 which pivots about a shaft 66. The shaft 66 is free to move horizontally in the slot 67. The spring arm 65 is urged to the position shown in FIGURE 9 through the action of a coil spring 70 compressed between a stop 71 connected to the conveyor rails 55 and a stop 72 connected to a horizontally movable shaft 73 connected to the shaft 66 and free to slide horizontally through an opening provided in the stop 71. Each pair of spring arms 65 is connected by a solid rod 75 so that the spring arms 65 positioned opposite each other on opposing conveyor hangers will move in unison. The gate is in its normally closed position as shown in FIGURE 9 such that a case or other packaged material riding on the conveyor rollers 56 will abut the roller 61 and will be prevented from falling off the end of the conveyor. To remove the case, the case is lifted the very slight distance so that the bottom of the case rides on the roller 61. Accordingly, the packages stored on the conveyors may readily be removed by simply slightly elevating the packages and then utilizing the gate rollers to assist when the package is pulled from the conveyor. The gate may also be opened to permit the contents on the conveyor to pass from the conveyor by gravity. In FIGURE 10, the gate is shown in its open position. The utilization of an open gate will greatly facilitate the automatic unloading of the conveyor and thereby permit all the contents of the conveyor to be removed without the intermediary of singular removal of the cases. Referring to FIGURE 10, the bar 75 has been engaged and pushed to the right such that the spring 70 has been compressed between the stops 71 and 72. The shaft 66 has followed the slot 67 to the right and, since the spring arms 65 are connected between the shaft 66 and the shaft 62, the rollers 61 are forced vertically downwardly to a position such that any packages or cases on the roller conveyor are permitted to roll from the end of the conveyor without interference. The gate is closed simply by permitting the coil spring 70 to expand and force the shaft 66 to the left and the shaft 62 upwardly.

The utilization of the overhead load bearing frame as described above permits the utilization of a greater number of conveyors that are readily accessible to the operator. If the same frame were positioned beneath the truck body, the upper conveyors would be too high for convenient access. Further, the bending stresses induced in the overhead load bearing frame member merely causes a slight separation between conveyor sections and in no way impairs the efficacy of the conveyor and does not interfere with the passage of cases of packaged materials on the conveyor. If the load bearing frame member were positioned beneath the conveyors, the flexure accompanying normal bending stresses would cause the upper conveyors to bind and would impose severe strains such that structural failure or interference with the conveyors would result in the necessity to reduce the load carried by the truck body. The conveyor arrangement of the present invention permits automatic loading of all of the conveyors in the truck body and also permits automatic unloading of the conveyors without complicating the structure of the truck body and without sacrificing the convenience of the operator when making deliveries of the cases carried by the truck. The gate of the present invention facilitates easy removal of cases or packages from the conveyors by providing a roller slightly elevated above the plane of the conveyor such that by slightly elevating the package, the bottom of the package may be placed upon the gate roller and readily removed simply by withdrawing the case or package therefrom.

Referring now to FIGS. 11 and 12, another preferred embodiment of the present invention is herein illustrated. The overhead load-bearing frame member 80 is formed from a pair of steel beams. Vertical support members 81 extend upwardly from the truck bed 82 supported above the ground through the expediency of a conventional spring axle and wheel arrangement 83 to support the rearward end of the overhead load-bearing frame member 80. Upwardly extending beams 84 support the forward end of the overhead load bearing frame 80 and in turn are joined to the frame portion 87 utilized to support the necessary hydraulically extending parking wheels 28. Transverse I-beams 88 are spaced equidistant along the length of the overhead load-bearing frame 80 and are reinforced by gussets 89. The basic modular load-carrying unit generally designated by the reference character 90 comprises a substantially horizontal floor panel 91 and a plurality of vertical support members 92 extending upwardly from the floor panel 91. A pair of tie beams 93 stabilize the upper end of the vertical support members 92. Parallel spaced U-channels 94 extend between the tie beams 93 and function as hangers supports for the modular load-carrying unit 90. The usual sheet metal covering 97 extends over the upper, rear, and front portions of the truck body. Overhead retractable doors 98 supported by the upper sheet metal covering 97 extend along either side of the truck body to enclose the depending modular units 90.

FIG. 13 specifically illustrates one preferred method by which the modular unit 90 is supported by the overhead frame member 90. The U-channel member 94 extends outward beyond the tie beam 93 creating a lip 99 which engages over and is supported by the lower horizontal portion 100 of the transverse I-beam 88. In one preferred embodiment, a bolt and nut arrangement 101 may extend through the lip 99 and the horizontal portion 100 of the transverse I-beam 88 to detachably retain the modular load-carrying unit 90.

Figure 14:
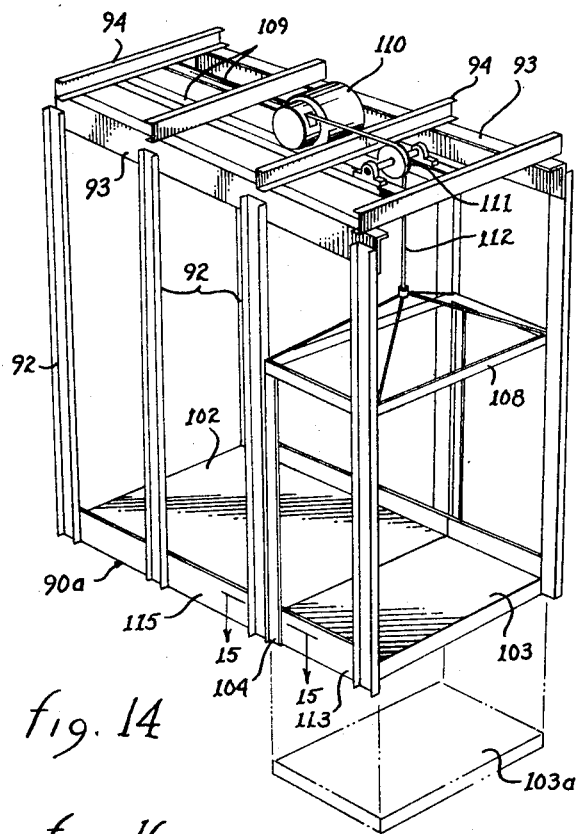
FIG. 14 is a perspective view of a modular load carrying unit used in connection with the truck body of FIG. 11 incorporating an elevator floor section.
Figure 15:
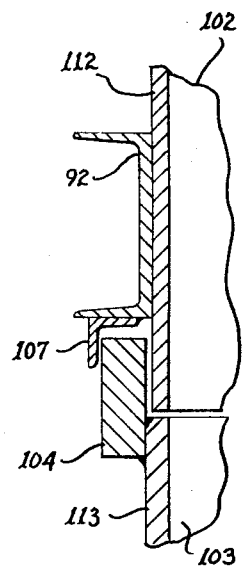
FIG. 15 is a plan sectional view taken along the line 15—15 of FIG. 14.

FIGS. 14 and 15 illustrate the second preferred modular load carrying unit 90a which is substantially a modification of the modular load carrying unit 90 hereinbefore described. The floor is comprised of two subpanels 102 and 103. The floor panel 102 is welded or otherwise secured to the upright support members 92. Rectangular guide members 104 extend upwardly from each corner of the floor panel 103. An angle iron 107 secured vertically along the support member 92 retains the guide 104. An upper frame 108 adjoins the upper end of the guide members 104. A pair of support beams 109 are secured to the underside of the U-channels 94. A power winch 110 and a pillow block and pulley arrangement 111 are carried by the supports 109. A cable 112 guided by the pillow block and pulley arrangement 111 and controlled by the winch 110 is connected to the upper frame 108. With this arrangement the floor panel 103 now functions as an elevator capable of being lowered to ground level as indicated by the alternate floor position 103a. Side retainer panels 113 and 115 extend along the edges of the floor panels 102 and 103 respectively.

Figure 16:
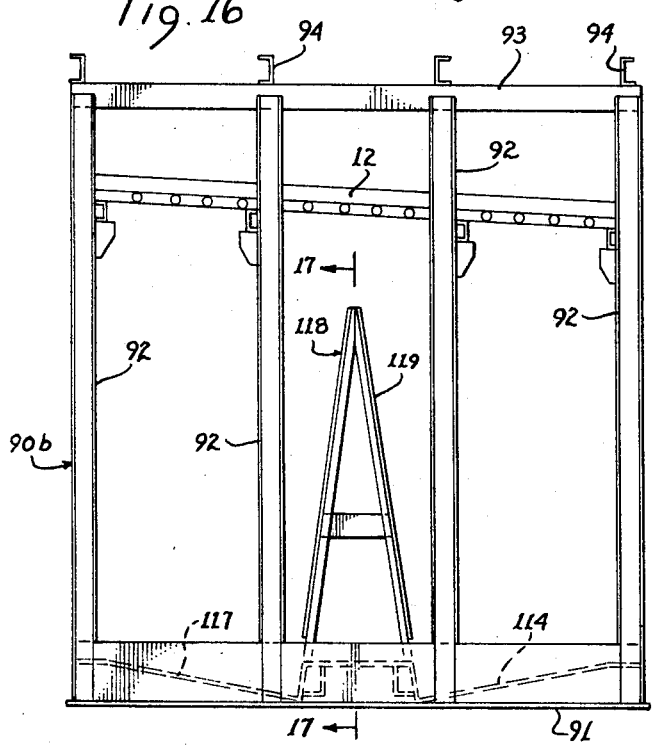
FIG. 16 is a side elevational view of a modular load carrying section especially designed for transporting cased bottles.
Figure 17:
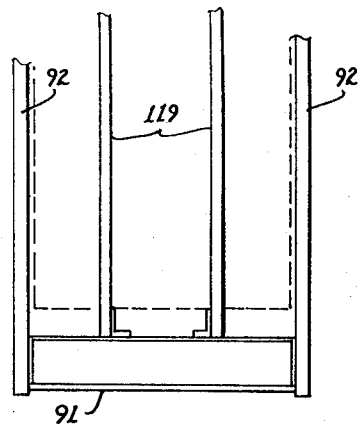
FIG. 17 is a sectional elevational view taken along the line 17—17 of FIG. 16.

Attention is now directed to FIGS. 16 and 17, which depict yet another modular load-carrying unit 90b. A pair of symmetrical floor panels 114 and 117 are superposed above the floor panel 91 and extend inwardly downward from the lateral edges of the modular load carrying unit 90b. An A-frame generally designated by the reference character 118 constructed of upwardly inwardly sloping panel members 119 extends upwardly from the floor panel 91 along the apex created by the union of the floor panels 114 and 117. A conveyor 12 as previously described in FIG. 5 transverses the modular load carrying unit 90 through the upper end thereof spaced above the apex of the A-frame 118.

Referring now to FIGS. 18 and 19, still another preferred modular load carrying unit 90c is specifically illustrated. A series of vertical conveyor supports 120 are positioned in spaced parallel arrangements between the vertical upright supports 92. Stringers 121 arranged in spaced parallel pairs traverse the load-carrying unit 90c sloping downwardly at one edge thereof and are supported by vertical support members 92 and the conveyor supports 120. Conveyor rollers 122 carried by stringers 121 slope inwardly in an opposed manner so as to form a conveyor trough to cradle cylindrical containers 123. A roller 127 carried by the arm 128 secured to the lower edge of each pair of stringers 121 forms a gate to retain the drums 123.

FIGS. 20 and 21 illustrate yet another modified load carrying unit 90d. Rectangular boxlike guides 128 are carried one by each of the U-channel members 94 in axial alignment. A box channel member 129 having an opening 130 extending its length centrally along the lower edge is slidably carried by internal engagement within the guides 128. A trolley arrangement 131 is disposed within the box channel 129 and free to traverse the length thereof. A shaft 132 depending downward from the trolley 131 extends through the opening 130 and supports a hand hoist 133.

In the foregoing detailed descriptions of preferred modular load-carrying units constructed in accordance with the teachings of the present invention, the basic load-carrying unit 90 is particularly adapted for carrying any type of packaged materials which may be stacked or placed upon the floor panel 91. The first modified modular load-carrying unit 90a has an elevator floor section 103 which operates between the normal floor 102 and ground level. This unit is particularly adapted for loading and unloading heavy bulky objects such as food vending machines wherein the floor section 103 may be lowered to the ground, the object placed upon the elevator floor section 103 and then raised by power to the normal transporting level. Objects may then be pushed from the elevator floor section onto the stationary floor section for transportation and to free the elevator section for subsequent pick-ups. The modular load-carrying unit 90b is particularly adapted for carrying cased bottles in the conventional manner currently employed by a prior art delivery truck. The load carrying unit 90c accommodates cylindrical containers such as tanks of pre-mixed soft drink ingredients. The tanks are loaded on the uphill side of the conveyors and removed from the downhill side. Convenient removal of the tanks is accomplished by simply lifting the front edge of the tank upwardly onto the roller gate 127 and then pulling the tanks forward. As full tanks to be delivered are removed from the downhill side, empty tanks for return to the bottling plant may be loaded upon the conveyors from the uphill side. Another varying load-carrying unit 90d is especially useful in lifting, loading and carrying bulky structures such as store displays. The box channel 129 may be extended beyond the confines of either side of the truck to position the hoist 123 directly over the load to be lifted.

It will be obvious to those skilled in the art that truck bodies of various lengths may be constructed to accommodate varying members of the load-carying units. Similarly, any given truck body may contain a series of identical load-carrying units or any combination thereof in accordance with the immediate transportation requirements.

Figure 22:
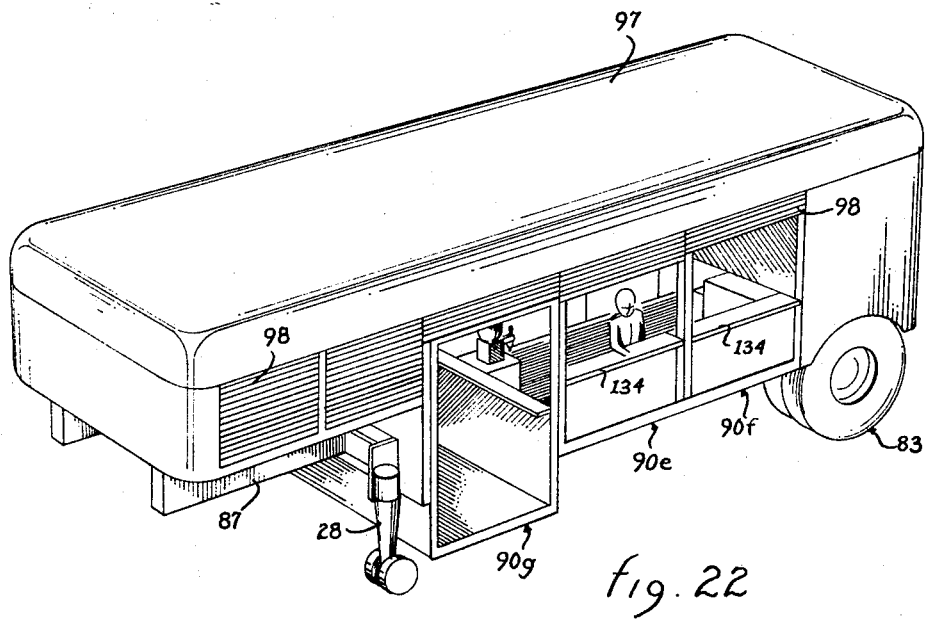
FIG. 22 is a perspective view of a truck body constructed in accordance with the teachings of the present invention incorporating modular load-carrying sections adapted and assembled to form a traveling restaurant.
Figure 23:
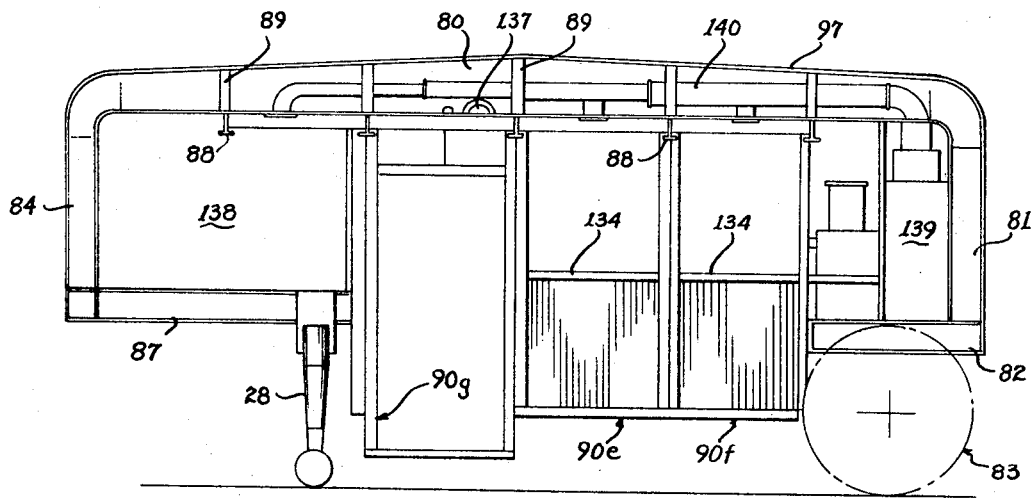
FIG. 23 is an elevational view in section schematically representing the components of the embodiment of FIG. 22.

Attention is now directed to FIGS. 22 and 23 which are illustrative of a truck body constructed in accordance with the teachings of the present invention and adapted for a specialized use. Two modular load-carrying units 90e and 90f are constructed as a portable snack bar. Serving counters 134 are exposed when the doors 98 are retracted upwardly. The modular unit 90g is constructed as a walk-through customer serving area capable of being lowered to ground level by the winch 137. A supply storage area 138 is provided in the forward portion of the truck body. An air conditioning unit 139 for either heating or cooling requirements is carried by the rear truck frame 82 and communicates with each of the load-carrying units and storage areas through appropriate conduit 140.

The portable snack bar herein described as exemplary of the versatility of the present invention. Other modular units may be constructed for portable displays, ticket sales booths or portable offices. Since the modular units are quickly detachable, the appropriately required truck body may be assembled with minimal time.

Various other changes and modifications in the device herein chosen for purposes of illustration in the drawings will readily occur to persons having ordinary skill in the art. To the extent that such modifications and changes do not depart from the spirit of the invention; they are intended to be included in the scope thereof, which is not limited to the embodiments specifically illustrated in the drawings but rather only by a just and fair interpretation of the claims.

Having fully described the invention in such manner as to enable those skilled in the art to understand and practice same, I claim:

1. A truck body comprising:
   (a) front and rear portions, a spring, axle and wheel arrangement positioned at the rear portion and having mounted thereon a unitary frame member extending upwardly and forwardly to form an overhead frame member, said frame member straddling the front and rear portions and forming the sole connective support between said portions; and
   (b) a plurality of contiguous conveyor sections between said front and rear portions depending from and supported solely by said overhead frame member, each said conveyor section comprising a plurality of vertically spaced conveyors extending transversely of said truck body.

2. The truck body of claim 1 wherein each conveyor section is inclined from horizontal to urge products supported thereby to a given side of said truck body; and including a plurality of gates, each secured to one end of a different one of said conveyors for contacting products supported thereon and preventing said products from falling from said conveyors.

3. The truck body of claim 2 wherein said gates each include a roller releasably secured in a position above a conveyor and a release means for lowering said roller to permit products supported by said conveyor to pass from said conveyor by gravity over said roller.

References Cited
UNITED STATES PATENTS

| | | | |
|---|---|---|---|
| 1,973,030 | 9/1934 | Webber | 214—396 |
| 2,318,794 | 5/1943 | Parker | 296—3 |
| 2,540,803 | 2/1951 | Alexander et al. | 214—394 |
| 2,556,399 | 6/1951 | Sanger et al. | 214—84 |
| 2,574,017 | 11/1951 | Copping | 296—3 |
| 3,094,233 | 6/1963 | Kowalke et al. | 214—394 |

ALBERT J. MAKAY, *Primary Examiner.*